United States Patent
Bowater et al.

(10) Patent No.: US 6,278,772 B1
(45) Date of Patent: Aug. 21, 2001

(54) VOICE RECOGNITION OF TELEPHONE CONVERSATIONS

(75) Inventors: Ronald John Bowater, Romsey; Lawrence Leon Porter, Lyndhurst, both of (GB)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/107,686

(22) Filed: Jun. 30, 1998

(30) Foreign Application Priority Data

Jul. 9, 1997 (GB) .................................................. 9714366

(51) Int. Cl.[7] .......................... H04M 1/64; H04M 11/00; H04M 3/00
(52) U.S. Cl. ........................ 379/88.13; 379/265; 379/68; 379/88.01; 379/88.27; 379/267
(58) Field of Search ................................. 379/265, 88.16, 379/34, 35, 202, 88.13, 280, 258–267, 203, 201, 67.1, 68

(56) References Cited

U.S. PATENT DOCUMENTS

| | | | |
|---|---|---|---|
| 5,241,586 | * 8/1993 | Wilson et al. | 379/88.11 |
| 5,535,256 | * 7/1996 | Maloney et al. | 379/34 |
| 5,982,857 | * 11/1999 | Brady | 379/88.19 |
| 6,026,148 | * 2/2000 | Dworkin et al. | 379/88.18 |
| 6,047,060 | * 4/2000 | Fedorov et al. | 379/265 |
| 6,067,516 | * 5/2000 | Levay et al. | 704/244 |
| 6,100,882 | * 8/2000 | Sharman et al. | 704/235 |
| 6,108,711 | * 8/2000 | Beck et al. | 709/242 |

* cited by examiner

Primary Examiner—Fan Tsang
Assistant Examiner—Ovidio Escalante
(74) Attorney, Agent, or Firm—Jerry W. Herndon

(57) ABSTRACT

Voice data requires large storage resources even when compressed and takes a long time to retrieve. Further the required information cannot normally be directly located and it is difficult to analyze the voice data for statistical information. There is described a method for performing a voice recognition function on a voice telephone conversation to convert the conversation into text data using a voice processing system. The method comprises receiving voice data representing the telephone conversation comprising a first series of speech data from an agent interspersed with a second series of speech data from a client and storing the first and second series of speech data as a single body of voice data for later retrieval. Then a voice recognition function is performed on the voice data to convert it into text data representing the telephone conversation and the text data is stored for later retrieval. Such a solution allows entire days/weeks or even months of conversation to be stored and accessed. Since the memory space required is considerably smaller for text storage it is possible to keep many days of conversation in directly accessible memory that may be searched by a computer. Furthermore it is possible to search for keywords typed from the keyboard and it is not necessary to manually scan the entire conversation for the desired topic.

32 Claims, 3 Drawing Sheets

VOICE RECOGNITION OF TELEPHONE CONVERSATIONS

FIELD OF INVENTION

This invention relates to voice recognition of telephone conversations.

BACKGROUND OF INVENTION

Some institutions, particularly in the finance and insurance industries, record their conversations with their clients for evidence in case of a dispute. For example, an insurance company may record half a million conversations a year, mainly the details of insurance claims, to ensure that the details remain consistent. Increasingly, such conversations are stored as voice data, usually on optical storage media. They can then be associated with the customer's records and retrieved if necessary.

One problem with voice data is that it requires large storage resources even when compressed and therefore takes a long time to retrieve. One second of uncompressed voice data typically requires 64k bytes of memory and 12.8k bytes of memory with 80% compression of the voice data. Based on these assumptions one minute of compressed conversation requires 770k bytes of memory and a medium sized company with 20 operators making an average of 4 hours conversation each per day would require about 3700M bytes of storage or 6 CDs per day at current storage capacities (about 700M bytes per CD at present). Normally the required conversation will be on a CD ROM in an archive and would need to be manually retrieved and loaded into a CD ROM drive to access the data. A large number of CD ROMs are required which can take time to physically load into and out of a CD ROM read/write device even when using a jukebox machine. A manual search for a particular conversation can take considerable time even if the approximate date and time is known. Once one has found the particular conversation one still needs to locate the relevant part and this takes further time.

A further problem is that the required information cannot be directly located. The whole conversation needs to be listened to before the relevant information can be located.

Furthermore it is difficult to analyze the voice data for statistical information, for example for marketing and management purposes.

European Patent publication 0633642 discloses audio data processing apparatus connected to a telephone network for recording voice data from a caller, for instance, in placing a catalog order in response to computer generated prompts. The apparatus records the voice data associated with the computer generated prompts, performs voice recognition on the voice data and uses the text data to place the catalog order.

European Patent publication 0664636 discloses an audio conferencing system comprising a network of workstations having voice conference and speech recognition software. Speech from one workstation is converted into text by the recognition software on that workstation and both the speech and text are transmitted to the other workstations in the conference by the conferencing software. The received text, together with locally generated text is stored in a text file so as to produce a set of minutes for the audio conference.

SUMMARY OF INVENTION

According to an aspect of the invention there is provided a method for processing a telephone conversation in a voice processing system, said method comprising the steps of: receiving voice data representing the telephone conversation comprising a first series of speech data from an agent interspersed with a second series of speech data from a client; storing the first and second series of speech data as a single body of voice data for later retrieval; performing a voice recognition function on the voice data to convert them into text data representing the telephone conversation; and storing the text data for later retrieval.

Such a solution allows entire days/weeks or even months of conversation to be stored as text and accessed on-line for quick and easy retrieval. One minute of conversation may comprise about 300 spoken words which when converted into text requires of order 3k bytes of memory or about 0.4% of the memory that compressed voice uses. For instance, it is possible to search for conversations on a particular topic using key words over several months of stored conversation. The conversation details are fully available to the searcher at a glance whereas previously one would have to listen to the entire conversation to find the relevant parts. This is much more convenient for agents to handle resulting in increased staff efficiency. The medium sized company referred to above could store 50 days worth of conversation on a single CD ROM.

Since the memory space required is considerably smaller for text storage it is possible to keep many days of conversation in directly accessible memory that may be searched by a computer. Furthermore it is possible to search for keywords typed from the keyboard and it is not necessary to manually scan the entire conversation for the desired topic.

Due to the searchability of the conversation in text form is now possible to apply statistical tools to the data to extract business information.

In one embodiment of the invention the first series of speech data from the agent and second series of speech data from the client are received as a single sequence of voice data whereby the single sequence of voice data is a direct digital representation of the telephone conversation. One way of achieving this could be for the voice processing system to act as a third party in a conference call between said agent and said client.

In another embodiment of the invention the first series of speech data from the agent is received and sent to the client and the second series of speech data from the client is received and sent to the agent. The advantage with receiving the speech data separately from the agent and the client is that the voice processing system can distinguish with ease which data belongs to which party. The method may then advantageously comprise combining the first and second series of speech data to form a single sequence of voice data which represents the whole telephone conversation. Preferably the method further comprises the step of storing an identifier associated with each message indicating the originator of the message and/or indicating the start time of the message.

An advantageous use of the invention is to perform the voice recognition function at a time when performance of other functions in the voice processing system is not maximum that is when there is spare capacity in the voice processing system. Typically the voice recognition function would be performed at a time when performance of other functions in the voice processing system is substantially at a minimum that is when the system is off-line when the call centre closes for the night.

Preferably the voice data is stored before the conversion process takes place so that the conversion process can be performed off-line. This allows resources to perform tasks that may be performed at later times during off peak hours or at night when no conversations need to be recorded.

With present technology the conversion process is performed at a rate slower than in real time to allow the most accurate conversion process to be used to minimize the errors in the recognition. However for the majority of purposes the recognition accuracy need not be 100%.

In another embodiment the conversion step is performed before the storing step and the voice and text data are stored together on non-volatile recording medium. This keeps both forms of data together for easy reference. Advantageously the voice and text data are stored on a CD ROM.

The text data by itself is additionally or alternatively stored on non-volatile recording medium for easy reference. The text version only would suffice for many usages whereas a voice version would be necessary for legal purposes such as evidence in a court of law and to check the accuracy of the voice recognition.

In the preferred embodiment both the voice and text data are stored on a CD ROM and in another embodiment the text data is also stored in a volatile recording medium.

It should be appreciated that the invention is independent of the precise architecture of the voice processing system or the storage system used for the voice and text data. It is applicable to tape storage and most other high capacity data storage devices.

BRIEF DESCRIPTION OF THE DRAWINGS

In order to promote a fuller understanding of this and other aspects of the present invention, an embodiment will now be described, by way of example only, with reference to the accompanying drawings in which.

DETAILED DESCRIPTION OF THE PREFERRED EMBODIMENT

Figure 1:
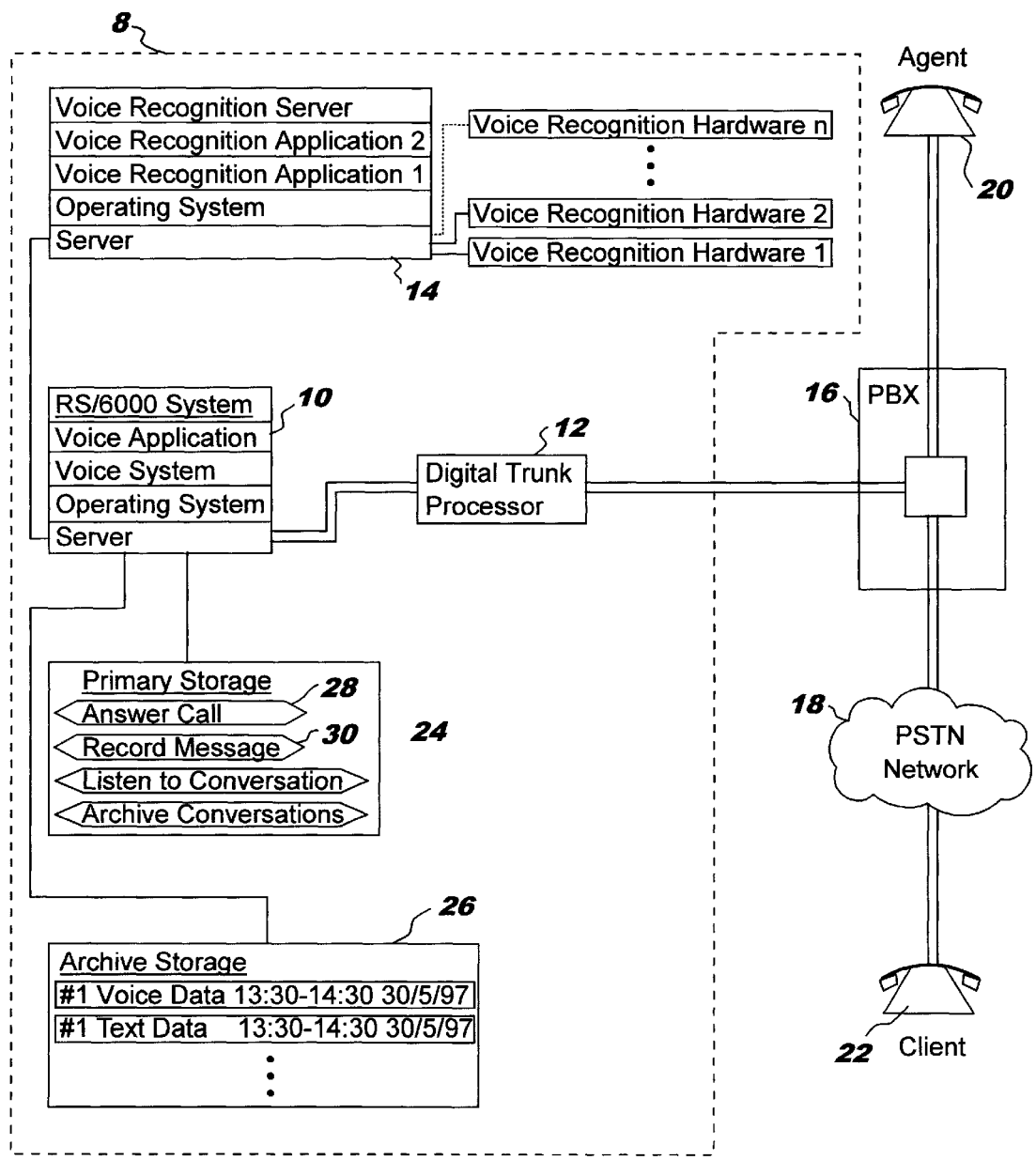
FIG. 1 is a schematic representation of one embodiment of the invention.

A voice processing system 8 according to the present embodiment comprises a computer server 10 such as IBM's RS/6000 System connected to a digital trunk processor 12 such as IBM's Multiple Digital Trunk Processor 9295 and a voice recognition server 14 (see FIG. 1). Connected to the digital trunk processor 12 is a private branch exchange (PBX) 16 or switch which connects to a public switched telephone network (PSTN) 18. An agent's telephone 20 is connected to an internal line on the PBX 16 which is further connected to a client's telephone 22 via the PSTN. Use of a PBX allows the conversations of multiple agents to be processed.

An overview of the operation of the preferred embodiment is as follows. A telephone connection is set up in the usual way through the PSTN 18 and the PBX 16, a client uses his telephone 22 to ring the agent 20 by dialling the agent's telephone number or vice versa. The computer server 10 is engaged and records the conversation between the client and the agent by opening a connection through the digital trunk processor 12 to the PBX 16. The computer server 10 sends the recorded conversation to the voice recognition server 14 which converts it into text and sends it back. The voice processing system 8 then archives the text conversation with the voice.

The computer server 10 comprises a microprocessor (for example an IBM RISC microprocessor), memory, primary storage 24 such as a hard disk, archive storage 26 such as a write once CD-ROM drive, color display, keyboard and mouse. Each component is connected to an address and data bus for communication with the other components. The computer server 10 runs an operating system such as IBM AIX v4.2 for RS/6000 and voice processing software such as IBM Direct Talk for AIX.

The primary storage 24 holds the operating system, voice processing software including a voice application and all the state table programs and custom server programs associated with it. On initialization the operating system and voice processing software are loaded into the computer server's memory so that they may be performed. Individual state table and custom servers are loaded from the primary storage 24 as and when required. A state table is a list of all actions used in a particular voice application and provides the basic logic of the interaction with callers, calling prompts and voice segments to provide voice output from the application. State tables can optionally call custom servers to provide other functions. A custom server is a C/C++ language program that provides data manipulation and local or remote data stream, database, or other services beyond those provided by a state table. Custom servers provide an interface between the voice application and business applications, functions, or other processes to give callers access to business information and voice processing functions such as speech recognition.

The write once CD-ROM is the archive storage 26 for the conversations for the text and/or the voice depending on the application. The CD-ROM is preferably the jukebox type which automatically selects and loads a CD from a library.

The digital trunk processor 12 is a combination of digital signal processor cards and supporting equipment that provides high quality voice compression and digital telephone signalling functions (transmit and receive) via an externally shielded cable to the attached computer server 10. The digital trunk processor 12 houses Packs consisting of a base card connected to a digital trunk adapter (DTA) 44 in the computer server 10, and a trunk interface card which manages the trunk connection to the PBX 16. IBM's Multiple Digital Trunk Processor contains slots for up to five Packs.

The voice recognition server 14 comprises standard server hardware and software with additional voice recognition software and/or one or more types of voice recognition hardware. The voice recognition server 14 is connected computer server 10 via a LAN network and sends messages to the computer server using a TCP protocol. The computer server controls and sends voice data from a telephone conversion to the voice recognition server 14 using the TCP protocol messages. The voice recognition server 14 uses one or more of the available methods to convert the voice data into text data representing the conversation and then sends the text data back to the computer server using a TCP protocol message by way of response.

The PBX 16 is a switch that concentrates the number of internal lines into a smaller number of external lines and provides advanced voice and data communication features. The PBX 16 connects to the public switched telephone network (PSTN) and to the digital trunk processor 12 using a digital trunk facility.

A more detailed description of the operation of the voice processing system 8 is as follows. Once the telephone connection is set up, the agent changes the two party call to a conference call with the voice processing system 8 as the third party (alternatively the voice processing system 8 can switch in). The change is typically made by placing the client on hold, dialling a reserved voice processing system number and after connection with the voice processing system selecting a conference mode to bring the client into the conference call. The number that the agent dials is designated by the PBX 16 as an internal number reserved for the voice processing system 8 and is designated by the voice processing system 8 as reserved for the archiving and speech recognition of conversations.

When the voice processing system 8 receives the required call from the PBX 16 an Answer Call state table 28 is executed which identifies the number dialled (by an external RS232 data link to the PBX 16 or using a special protocol) and the speech to text function is chosen. Other functions may be available on the voice processing system 8 such as voice mail function, fax back functions or automated operator services. The number dialed identifies that the speech to text conversion function is required.

The Answer Call state table 28 calls a Record Message state table 30 which instructs the voice processing system 8 to record the conversation between the client and the agent. At this stage the voice processing system 8 may indicate to the agent that recording has started. Voice data from the conversation is sent from the PBX 16 and the digital trunk processor 12 to the computer server 10 and placed on a data bus. A memory controller attached to the data bus stores the voice data in the primary memory or the archive memory. The recording of the voice data is terminated on completion of the call or when the agent terminates the conference call with the voice processing system 8 for instance by pressing a telephone keypad key and sending a particular DTMF tone which the Record message state table 30 recognizes. On termination the Record Message state table 30 closes and the connection between the voice processing system 8 and the PBX 16 closes.

Once the agent has finished the call to the client the voice processing system 8 can start an Acquire Conversation Info state table (not shown) which contacts the agent to acquire certain information like the client's reference. Other information like the date, time, telephone numbers may be automatically deduced by the voice processing system 8. In deducing the information the voice processing system may use information stored on the agents's terminal.

In the preferred embodiment the voice processing system 8 does not perform voice recognition on the voice data simultaneously or even immediately after the termination of recording the voice data. In an active voice processing system 8 the resources needed to perform voice recognition are considerable and may be required to perform other tasks such as automatic operator or transaction functions in real time during peak hours of usage. Since the voice data of the conversation has been stored in the primary 24 or archive 26 storage the speech to text conversion may be performed at any time and preferably in off peak hours. This is particularly useful in systems where the line capacity of the voice recognition server is smaller than the voice processing system.

The voice processing system 8 monitors its own resource usage and determines if there is enough capacity to perform the speech recognition function on the stored voice data conversations. When it is so determined an Archive Conversations state table 32 (or custom server) is started; this fetches the voice data and creates a network message including instructions and the voice data for sending to the voice recognition system over the LAN connection. The instructions may include parameters such as the accuracy required for a particular conversion.

In the preferred embodiment the voice recognition system has several hardware and software resources for performing the conversion and has the means available for determining which one or which selection of resources are to be used on a particular conversation. The factors effecting this would include the resources available, time available and the accuracy required for the conversion job. If several resources are to be used the voice recognition server 14 instructs each server separately and receives a corresponding number of responses including text data back once the conversion is complete. The responses are analyzed and a final text version is determined. Each response is similar in structure to the others but some may differ in the detail; for instance in particular words. Where particular words differ in two versions error values associated with the respective words are compared to decide which word is to be used in the final version. Once the final version is determined a response message is sent to the computer server 10.

The computer server 10 receives the message and archives the text data on the write once CD ROM with the conversation information including the day and time and the call and customer references. The voice data is also archived with the text if that is what the application requires or in the preferred embodiment the text data is archived on its own to create a compact searchable database.

Figure 2:
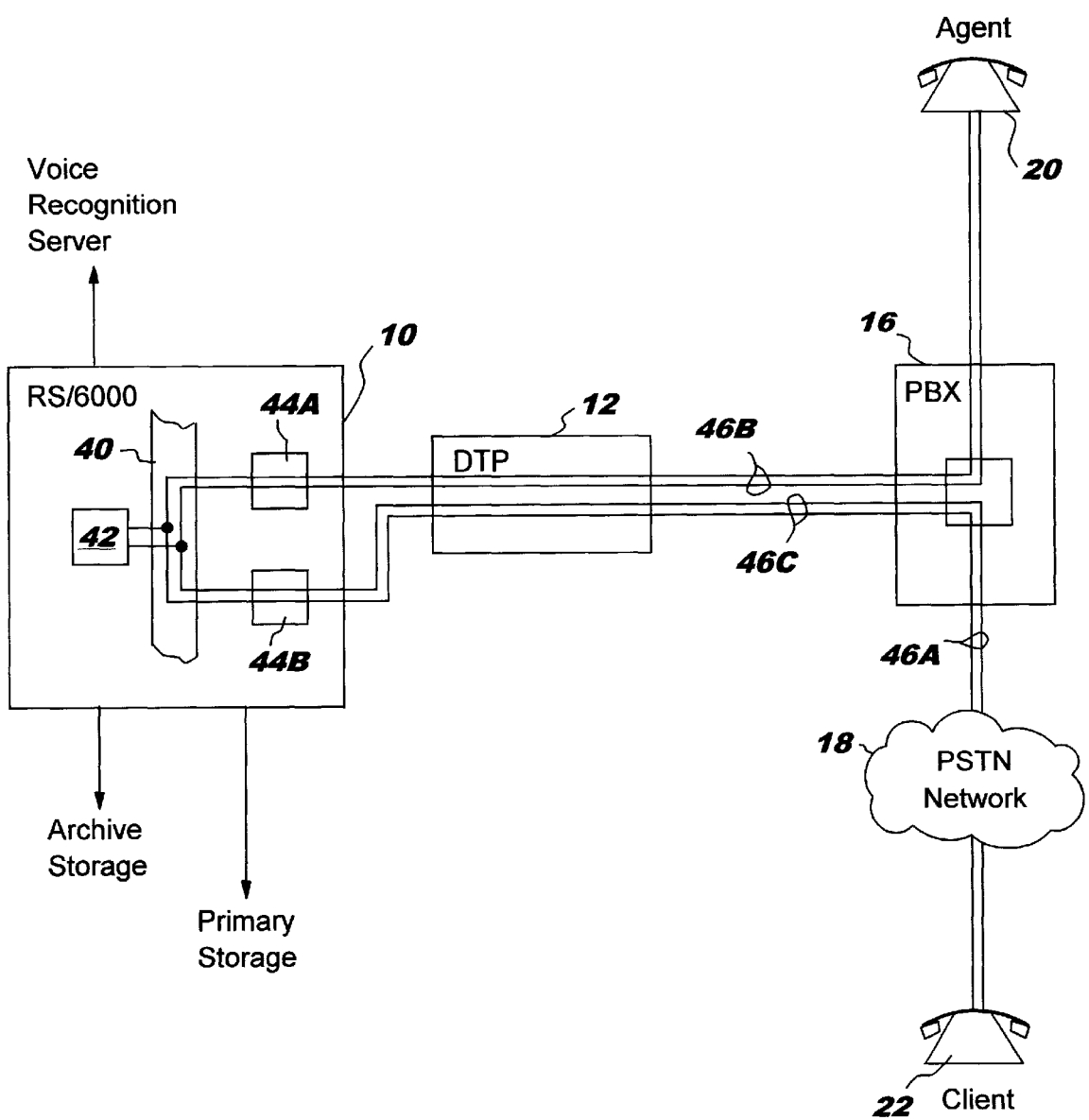
FIG. 2 is a schematic representation of a second embodiment of the invention.

One of the difficulties involved with voice recognition of a conference conversation is to distinguish between the different parties in the conversation. In the embodiment described above the voice data from the agent and the voice data from the client are sent together on a single channel to the voice processing system 8 and are indistinguishable apart from the actual sound of their voices. The voice recognition resources may be provided with some capability to distinguish by recognizing the voices and/or using pauses in the conversation but the errors can be noticeable. An advantage of using a voice processing system 8 to perform recognition and archiving of the conversation is that separate channels may be used for the input of the agents voice data and the clients voice data. A description of an alternative embodiment for recording a conversation is as follows (see FIG. 2).

A dedicated voice data bus comprising a time-division multiplex bus (TDM) 40 forms part of the computer server 10 for real time transfer of data. Using this bus many channels of voice data may be transmitted at hi-speed over a smaller number of physical connections by multiplexing the data into time slots at the transmitting end and demultiplexing at the receiving end. One such channel can be considered, for instance, to be a half-duplex unidirectional stream of 64Kbps. One time slot is the smallest switchable data unit on a data bus, consisting of eight consecutive bits of data. The digital trunk adapters are connected to both the TDM bus and the computer server address and data bus so that voice data can be placed over the computer server data or the more efficient TDM bus. A hi-speed storage controller 42 is connected to the TDM bus 40 to read the data into memory, primary storage 14 or archive storage 26. The DTA's 44A and 44B have connections to the TDM bus so that voice data may be transferred onto this bus or the server data bus depending on the application.

The TDM bus 40 allows a trombone connection in which a telephone call can be connected using two voice channels on the TDM 40. This connects the calls together in the computer server as if they were connected directly in the PBX 16. Such a connection allows the voice processing system 8 to simultaneously process voice data from both channels as the telephone connection continues unaware of the involvement of the voice processing system 8.

The operation of the alternative embodiment is as follows. A telephone connection is set up in the normal way. To start recording the conversation the agent puts the client connection 46A on hold and dials the appropriate number for the voice processing system 8, this sets up a connection 46B to the computer server 10. The Answer Call state table 28 answers the agent's call and determines that a TDM connection is to be set up and the conversation is to be recorded. A Record Message#2 state table is invoked for that purpose. The Record Message#2 state table requests a digital trunk adapter 44A on which the agent's call is incoming to connect the agent to particular channels on the TDM bus 40. The Record Message#2 state table also requests the digital trunk adapter 44A (since one DTA can handle multiple calls) or another digital trunk adapter 44B to set up another connection 46C to the PBX 16 and to connect this to the client connection 46A on hold. Then the client call is connected at the other end to the respective channels on the TDM. Further the Record Message#2 state table instructs the hi-speed memory controller 42 to connect to the TDM bus 40 in order to store the client's voice data and the agent's voice data in the primary storage 24.

The voice processing system 8 distinguishes between the agent's messages and the client's messages as they are on different channels and simultaneously records the start time of each message and the name of the originating party into a control file. The two streams of voice data are saved in one voice data file in the order in which they are received as a sequence of messages so that the voice data file represents a complete recording of the conversation. The control file is associated with the voice file so that it may be used in the voice recognition function.

Alternatively each message is prefixed with a control code to identify which of the agent or caller spoke the message and this is saved in the voice file with the voice data. The control codes may additionally identify the precise time of the message within the conversation. The control codes are labelled in the voice file so that the speech recognition function will identify them as control codes and not voice data.

A further format may be used to solve the problem of interruptions. If one message runs into another message as is common in conversations the interruption message is buffered until the first message is finished and is then saved.

Therefore by using this alternative embodiment, overlapping speech maybe separated for processing. A control code with the timing of the interruption is saved so that a playback application can play the messages as spoken or with the interruption buffering. With the client's and agent's message completely separate the speech recognition software has increased likelihood of making a successful conversion to text.

An advantage of identifying and separating the messages is that the speakers may have different patterns of speech which would require different voice/text vocabularies for optimum conversion. The parties may be conversing in different languages or in the same language with different accents. In this case the voice recognition server 14 may perform an analysis on the separated messages to find the optimum vocabulary for each separated set of messages.

Figure 3:
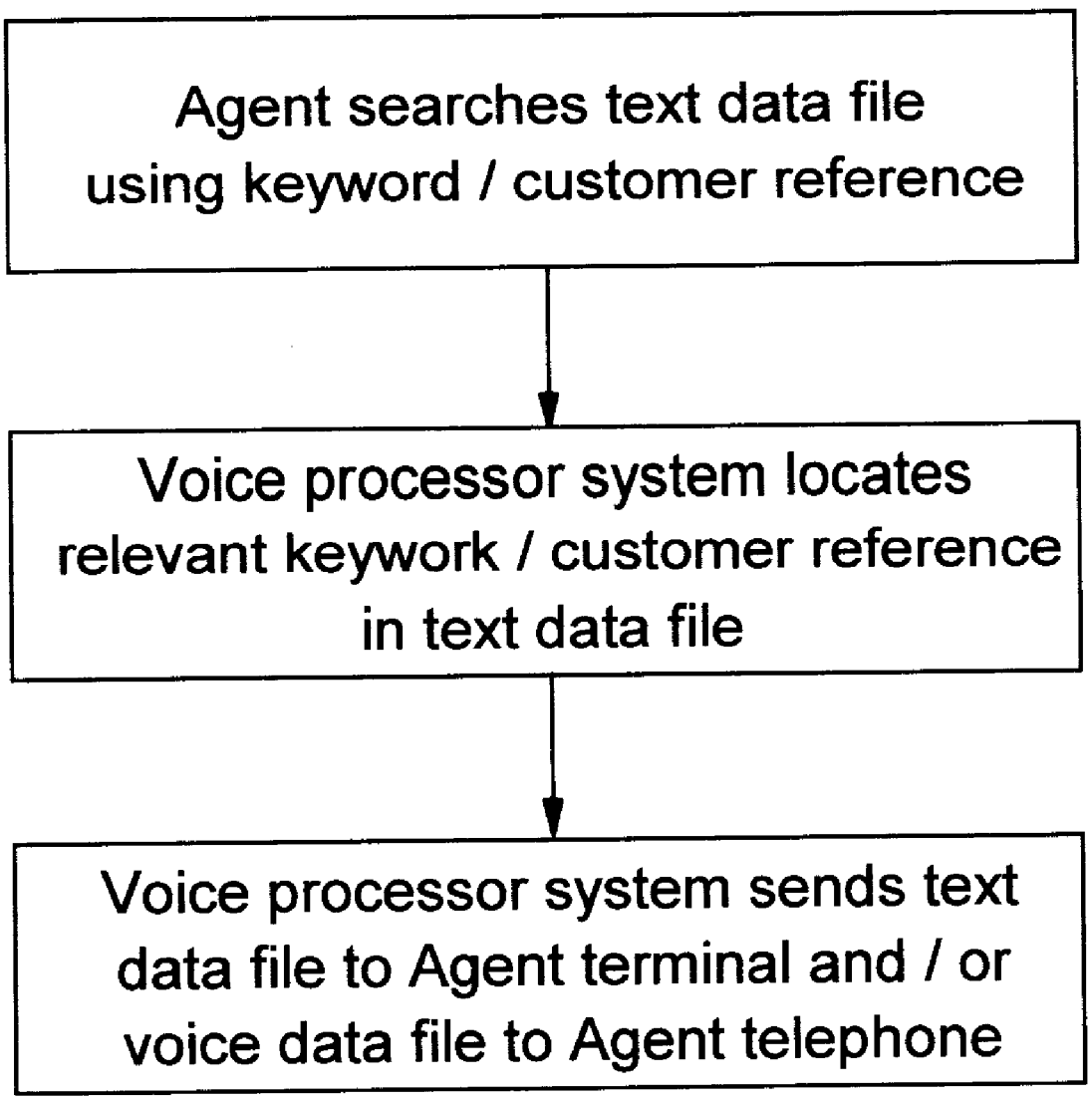
FIG. 3 is a flow diagram of the process of searching and retrieving the Archive storage.

Referring now to FIG. 3 one example of using the Archive storage is described. Connected to the voice processing system is a computer network comprising terminals for use by an agent. Such terminals have access, through the voice processing system to primary and archive storage. An agent or terminal user wishes to search the Archive storage for a previously stored voice and text data from a particular conversation using keywords or a customer reference as search criteria. A request to search to the Archive storage is sent in the form of a message from the terminal over the network to the voice processing system (step 1). The voice processing system receives the search message and extracts the search criteria using it to locate the text data from the Archive storage. The particular text data of a conversation which is located is retrieved in full from the archive storage and sent over the network to the agent terminal. Additionally or alternatively the voice data may be played over a channel to the agent's telephone.

Now that the invention has been described by way of a preferred embodiment, various modifications and improvements will occur to those persons skilled in the art. For instance the voice recognition system may not be distributed but exist in the form of a hardware card on the computer server 10 itself acquiring voice data from data bus or the TDM bus. The first embodiment may pass the conference call voice data over the data bus or the TDM bus. The network connecting the computer server 10 and the voice recognition server 14 may be any kind of data link. Therefore it should be understood that the preferred embodiment has been provided as an example and not as a limitation.

In summary voice data requires large storage resources even when compressed and takes a long time to retrieve. Further the required information cannot normally be directly located and it is difficult to analyze the voice data for statistical information. There is described a method for performing a voice recognition function on a voice telephone conversation to convert the conversation into text data using a voice processing system. The method comprises receiving voice data representing the telephone conversation comprising a first series of speech data from an agent interspersed with a second series of speech data from a client and storing the first and second series of speech data as a single body of voice data for later retrieval. Then a voice recognition function is performed on the voice data to convert it into text data representing the telephone conversation and the text data is stored for later retrieval. Such a solution allows entire days/weeks or even months of conversation to be stored and accessed. Since the memory space required is considerably smaller for text storage it is possible to keep many days of conversation in directly accessible memory that may be searched by a computer. Furthermore it is possible to search for keywords typed from the keyboard and it is not necessary to manually scan the entire conversation for the desired topic.

What is claimed is:

1. In a voice processing system having a voice recognition resource for processing voice data, a method for processing a telephone conversation comprising the steps of:

receiving voice data representing the telephone conversation comprising a first series of speech data from an agent workstation interspersed with a second series of speech data from a client workstation;

storing the first and second series of speech data for later retrieval by the voice processing system for voice recognition processing;

monitoring the capacity of the voice recognition resource;

determining if there is enough capacity in the voice recognition resource; and when so determined performing voice recognition on the voice data to convert it into text data representing the telephone conversation; and storing the text data for later retrieval.

2. A method as claimed in claim 1 further comprising the steps of:

receiving the first series of speech data from the agent and second series of speech data from the client as a single sequence of voice data.

3. A method as claimed in claim 2 further comprising said voice processing system 8 being a third party in a conference call between said agent and said client.

4. A method as claimed in claim 1 further comprising the steps of:

receiving the first series of speech data from the agent and sending it on to the client; and receiving the second series of speech data from the client and sending it on to the agent.

5. A method as claimed in claim 4 further comprising combining the first and second series of speech data to form a single sequence of voice data.

6. A method as claimed in claim 5 wherein the voice recognition function is performed in slower than real time.

7. A method as claimed in claim 6 wherein the voice data for a plurality of conversations is stored together and converted together.

8. A method as claimed in claim 7 wherein the voice and text data are stored together.

9. A method as claimed in claim 4 further comprising the step of storing an identifier associated with each message indicating the originator of the message and/or indicating the start time of the message.

10. A method as claimed in claim 9 comprising storing the identifiers in a control file associated with the conversation.

11. A method as claimed in claim 10 further comprising the steps of:

receiving a search request including search criteria;

searching for the text data on the storage device comprising the search criteria; and locating the text data and corresponding voice data according to the search criteria.

12. A voice processing system comprising:

a voice recognition resource for processing voice data means for receiving voice data representing the telephone conversation comprising a first series of speech data from an agent interspersed with a second series of speech data from a client;

means for storing the first and second series of speech data as a single body of voice data for later retrieval;

means for monitoring the usage of the voice recognition resource;

means for determining if there is enough resource capacity in the voice processing system; and means for, when so determined, initiating voice recognition on the voice data to convert them into text data representing the telephone conversation; and means for storing the text data for later retrieval.

13. A voice processing system as claimed in claim 12 further comprising:

means for receiving the first series of speech data from the agent and second series of speech data from the client as a single sequence of voice data.

14. A voice processing system as claimed in claim 13 whereby said voice processing system (8) is a third party in a conference call between said agent and said client.

15. A voice processing system as claimed in claim 12 further comprising:

means for receiving the first series of speech data from the agent and sending it on to the client; and means for receiving the second series of speech data from the client and sending it on to the agent.

16. A voice processing system as claimed in claim 15 further comprising:

means for combining the first and second series of speech data to form a single sequence of voice data.

17. A voice processing system as claimed in claim 16 wherein the voice recognition function is performed in slower than real time.

18. A voice processing system as claimed in claim 17 wherein the voice data for a plurality of conversations is stored together and converted together.

19. A voice processing system as claimed in claim 18 wherein the voice and text data are stored together.

20. A voice processing system as claimed in claim 15 further comprising: means for storing an identifier associated with each message indicating the originator of the message and/or indicating the start time of the message.

21. A voice processing system as claimed in claim 20 comprising: means for storing the identifiers in a control file associated with the conversation.

22. A method as claimed in claim 21 further comprising:

means for receiving a search request including search criteria;

means for searching for the text data on the storage device comprising the search criteria; and means for locating the text data and corresponding voice data according to the search criteria.

23. A computer-readable storage medium storing a computer program product that, when run in a voice processing system comprising a voice recognition resource for processing voice data, the stored program executing the steps of:

receiving voice data representing the telephone conversation comprising a first series of speech data from an agent workstation interspersed with a second series of speech data from a client workstation;

storing the first and second series of speech data for later retrieval by the voice processing system for voice recognition processing;

monitoring the capacity of the voice recognition resource;

determining if there is enough capacity in the voice recognition resource; and when so determined, performing voice recognition on the voice data to convert it into text data representing the telephone conversation; and storing the text data for later retrieval.

24. A computer-readable storage medium as claimed in claim 23 wherein said stored program further executing the steps of:

receiving the first series of speech data from the agent and second series of speech data from the client as a single sequence of voice data.

25. A computer-readable storage medium as in claim 24 wherein said voice processing system being a third party in a conference call between said agent and said client.

26. A computer-readable storage medium as in claim 24 said stored program further executing the steps of:

receiving the first series of speech data from the agent and sending it on to the client; and receiving the second series of speech data from the client and sending it on to the agent.

27. A computer-readable storage medium as in claim 26 said stored program further executing the step of combining the first and second series of speech data to form a single sequence of voice data.

28. A computer-readable storage medium as claimed in claim 27 wherein the voice recognition function is performed in slower than real time.

29. A computer-readable storage medium as in claim 28 wherein the voice data for a plurality of conversations is stored together and converted together.

30. A computer-readable storage medium as in claim 29 wherein the voice and text data are stored together.

31. A computer-readable storage medium as in claim 26 wherein the stored program further executing the step of storing an identifier associated with each message indicating the originator of the message and/or indicating the start time of the message.

32. A computer-readable storage medium as in claim 31 wherein the stored program further executing the step of storing the identifiers in a control file associated with the conversation.

* * * * *